United States Patent
Morrison et al.

(10) Patent No.: US 9,604,145 B2
(45) Date of Patent: *Mar. 28, 2017

(54) ADAPTIVE TASK ASSIGNMENT FOR ONLINE GAMES THAT USES PLAYER PROFILES

(71) Applicant: Zynga Inc., San Francisco, CA (US)

(72) Inventors: Travis Morrison, San Francisco, CA (US); Chandra Janakiraman, San Francisco, CA (US); Brian Crowder, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,407

(22) Filed: Oct. 26, 2015

(65) Prior Publication Data

US 2016/0045830 A1     Feb. 18, 2016

Related U.S. Application Data

(63) Continuation of application No. 13/875,278, filed on May 1, 2013, now Pat. No. 9,168,458, and a continuation of application No. 13/875,266, filed on May 1, 2013, now Pat. No. 9,186,584.

(60) Provisional application No. 61/675,819, filed on Jul. 26, 2012, provisional application No. 61/676,325, filed on Jul. 26, 2012.

(51) Int. Cl.
| | |
|---|---|
| *A63F 13/12* | (2006.01) |
| *A63F 13/67* | (2014.01) |
| *A63F 13/30* | (2014.01) |
| *A63F 13/795* | (2014.01) |
| *A63F 13/79* | (2014.01) |
| *A63F 13/798* | (2014.01) |
| *A63F 13/44* | (2014.01) |
| *A63F 13/95* | (2014.01) |

(52) U.S. Cl.
CPC .............. *A63F 13/67* (2014.09); *A63F 13/12* (2013.01); *A63F 13/44* (2014.09); *A63F 13/79* (2014.09); *A63F 13/795* (2014.09); *A63F 13/798* (2014.09); *A63F 13/95* (2014.09)

(58) Field of Classification Search
CPC ................................. A63F 13/12; G07F 17/32
See application file for complete search history.

(56) References Cited

U.S. PATENT DOCUMENTS

2012/0290565 A1*  11/2012  Wana .................. G06F 17/3089
                                                              707/723

* cited by examiner

*Primary Examiner* — Omkar Deodhar
(74) *Attorney, Agent, or Firm* — Martine Penilla Group, LLP

(57) ABSTRACT

Software at an online game website assigns to a player of a massively multiplayer online (MMO) game a first game task in a conditional series of game tasks. The assignment is based at least in part on a measure of difficulty associated with the first game task. The measure of difficulty depends on a profile associated with the player that includes an Active Social Network (ASN) metric as determined by data that has been read from an in-memory database and that has been retrieved from a social networking website through an application programming interface (API) exposed by the social networking website. Then the software provides a reward to the player upon termination of the conditional series of game tasks. The reward depends at least in part on the game tasks in the conditional series of game tasks that were completed by the player.

20 Claims, 15 Drawing Sheets

| ASN | Cash spent Control | Spend/starter Control | Cash Spent Dynamic | Spend/starter Dynamic |
|---|---|---|---|---|
| 0 | 10592 | 1.15 | 11672 | 1.24 |
| 1-10 | 73796 | 0.71 | 111284 | 1.05 |
| 11-20 | 47336 | 1.16 | 57344 | 1.38 |
| 21-30 | 34480 | 1.50 | 39504 | 1.66 |
| 31-40 | 32908 | 1.94 | 26344 | 1.53 |
| 41-50 | 20012 | 1.56 | 24816 | 1.87 |
| >50 | 129908 | 2.62 | 119396 | 2.40 |

ADAPTIVE TASK ASSIGNMENT FOR ONLINE GAMES THAT USES PLAYER PROFILES

RELATED APPLICATIONS

This application is a continuation application of U.S. patent application Ser. No. 13/875,278, entitled "Adaptive Task Assignment for Online Games", which was filed on May 1, 2013, and which claims priority to U.S. Provisional Patent Application No. 61/675,819 and U.S. Provisional Patent Application No. 61/676,325, which were filed on Jul. 26, 2012. This application is also a continuation application of U.S. patent application Ser. No. 13/875,266, entitled "Adaptive Task Assignment for Online Games That Uses Player Profiles", which was filed on May 1, 2013, and which claims priority to U.S. Provisional Patent Application No. 61/675,819 and U.S. Provisional Patent Application No. 61/676,325, which were filed on Jul. 26, 2012. This application incorporates by reference the disclosures of each of the applications identified above.

BACKGROUND

A massively multiplayer online (MMO) game is capable of supporting thousands of players simultaneously. Typically, such games involve video. A social MMO game is a MMO that leverages an online social graph (or network) to make an MMO game more interesting to its players. Often social graphs are maintained by social networking websites such as Facebook or social media websites such as MySpace. But one might think of a contact list, buddy list, or another similar access control list (ACL) as also being a social graph.

Keeping players engaged in social MMO games is important to revenue generation, e.g., from the purchase of virtual goods or from third-party advertisements. If players are assigned game tasks that are too difficult for them to accomplish, players tend to become discouraged and withdraw from the game, leading to a reduction in revenue. But player attrition can also occur, if players are assigned game tasks that are too easy and become bored. Consequently, finding the "sweet spot" in terms of difficulty for game tasks continues to be an ongoing area of research and experimentation for the designers of social MMO games.

SUMMARY

In an example embodiment, a processor-executed method is described for engaging players in a massively multiplayer online (MMO) game. According to the method, software at a MMO game website assigns to a player of an MMO game a first game task in a conditional series of game tasks. Each game task includes a specified duration. At least one of the game tasks in the conditional series of game tasks is a social game task that can be completed with the assistance of one or more persons associated with the player by an access control list. The software determines whether the player completed the first game task within the specified duration. If the player did not complete the first game task within the specified duration, the software assigns the player a second game task in the conditional series of game tasks that is less difficult to complete than the first game task. If the player completes the first game task within the specified duration, the software assigns the player a third game task in the conditional series of game tasks that is more difficult to complete than the first game task. Then the software provides a reward to the player upon termination of the conditional series of game tasks. The reward depends at least in part on the game tasks in the conditional series of game tasks that are completed by the player.

In another example embodiment, an apparatus is described, namely, computer-readable storage media that persistently store a program for engaging players in a MMO game. The program might be part of the software at a MMO game website. The program assigns to a player of an MMO game a first game task in a conditional series of game tasks. Each game task includes a specified duration. At least one of the game tasks in the conditional series of game tasks is a social game task that can be completed with the assistance of one or more persons associated with the player by an access control list. The program determines whether the player completed the first game task within the specified duration. If the player did not complete the first game task within the specified duration, the program assigns the player a second game task in the conditional series of game tasks that is less difficult to complete than the first game task. If the player completes the first game task within the specified duration, the program assigns the player a third game task in the conditional series of game tasks that is more difficult to complete than the first game task. Then the program provides a reward to the player upon termination of the conditional series of game tasks. The reward depends at least in part on the game tasks in the conditional series of game tasks that are completed by the player.

Another example embodiment also an apparatus, namely, a system. The system includes one or more processors and a memory in communication with the one or more processors and storing instructions that are executable by the processors. The instructions assign to a player of an MMO game a first game task in a conditional series of game tasks. Each game task includes a specified duration. At least one of the game tasks in the conditional series of game tasks is a social game task that can be completed with the assistance of one or more persons associated with the player by an access control list. The instructions determine whether the player completed the first game task within the specified duration. If the player did not complete the first game task within the specified duration, the instructions assign the player a second game task in the conditional series of game tasks that is less difficult to complete than the first game task. If the player completes the first game task within the specified duration, the instructions assign the player a third game task in the conditional series of game tasks that is more difficult to complete than the first game task. Then the instructions provide a reward to the player upon termination of the conditional series of game tasks. The reward depends at least in part on the game tasks in the conditional series of game tasks that are completed by the player.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 7A is a table showing the spending effects of adaptively assigning social game tasks on the basis of Active Social Network (ASN), in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
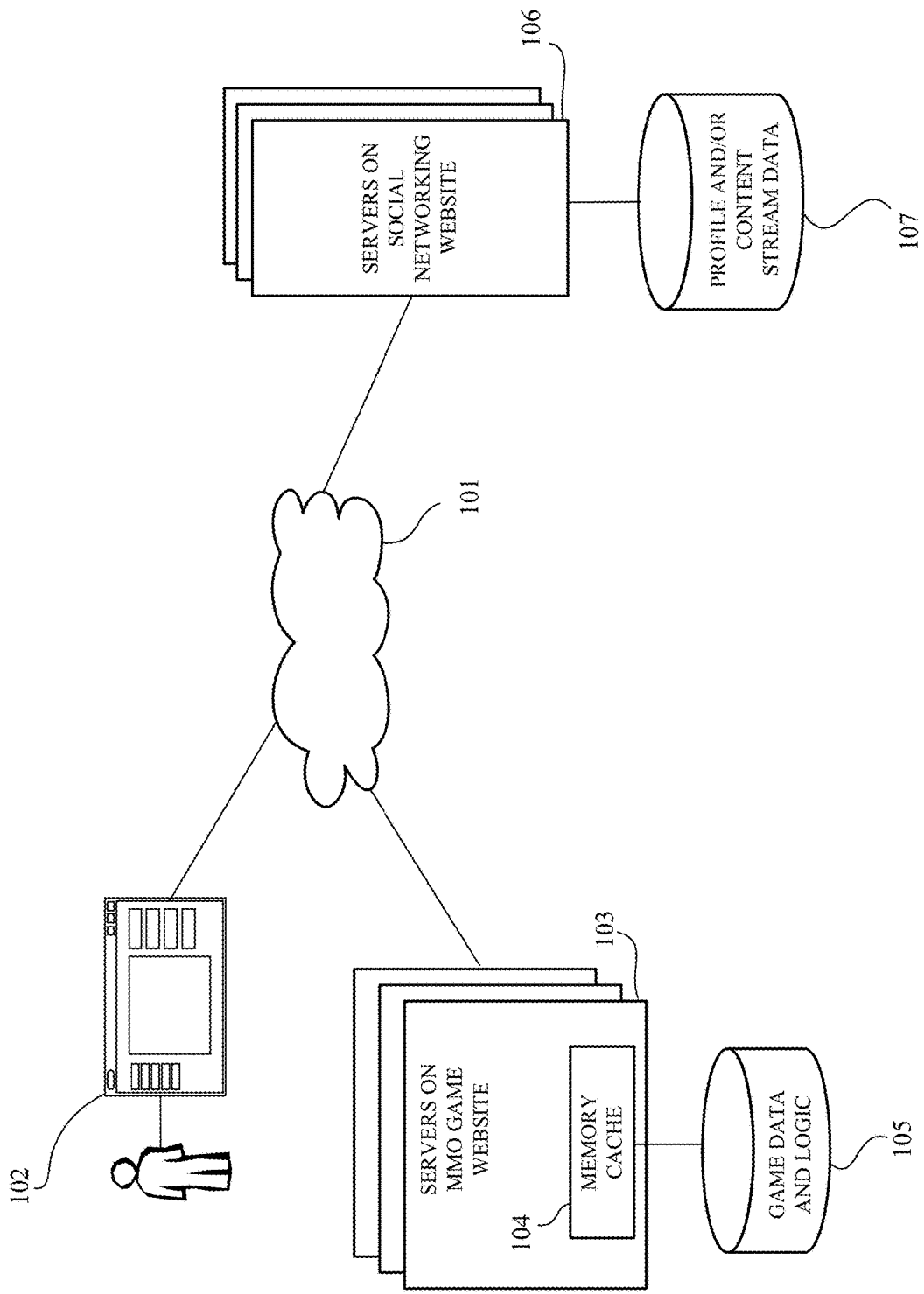
FIG. 1 is a simplified diagram that illustrates a network for an MMO game, in accordance with an example embodiment.

FIG. 1 is a simplified diagram that illustrates a network for an MMO game, in accordance with an example embodiment. As depicted in this figure, a personal computing device 102 is connected by a network 101 (e.g., a wide area network (WAN) including the Internet, which might be wireless in part or in whole) with a website 103 hosting a massively multiplayer online (MMO) game (e.g., a website such as Zynga hosting FarmVille or Blizzard Entertainment hosting World of Warcraft) and a website 106 hosting a social network (e.g., a social networking website such as Facebook). As used here and elsewhere in this disclosure, the term "social networking website" is to be broadly interpreted to include, for example, any website that allows its users to selectively access (e.g., according to a contact list, buddy list, social graph, or other access control list (ACL)) content in each other's profiles and/or streams or selectively communicate (e.g., according to a contact list, buddy list, social graph, or other ACL) with each other (e.g., using a messaging protocol such as email, instant messaging, short message service (SMS), etc.).

The personal computing device 102 might be (a) a laptop or other personal computer or (b) a mobile device such as a smartphone, (e.g., an iPhone, Blackberry, Android, etc.), a tablet computer (e.g., an iPad), etc. In an example embodiment, each of the websites 103 and 106 might be composed of a number of servers connected by a network (e.g., a local area network (LAN) or a WAN) to each other in a cluster or other distributed system which might execute cloud platform software. The servers in website 103 and 106 might also be connected (e.g., by a storage area network (SAN)) to persistent storages 105 and 107, respectively. In an example embodiment, persistent storages 105 and 107 might include a redundant array of independent disks (RAID).

Persistent storage 105 might be used to store algorithms and data related to an MMO game and its players, including data about the players received by website 103 from website 106 (e.g., through an application programming interface (API) exposed by website 106). In an example embodiment, some of the data from persistent storage 105 might be cached in memory cache 104 in volatile memory on servers on website 103 (e.g., using (a) an in-memory database or main memory database system (MMDB) or (b) a hybrid in-memory database that also uses persistent storage) in order to improve performance. Persistent storage 107 might be used to store data (including content) associated with a profile and/or stream for members of a social network (or social graph), e.g., users who are associated with each other through access-control lists (ACLs).

As indicated above, personal computing device 102 might be a laptop or other personal computer. In that event, personal computing device 102 and the servers in website 103 and 106 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs directly or indirectly (e.g., through virtualization software) on the hardware. Or the operating system for the servers might be replaced by a hypervisor or other virtualization software. Alternatively, personal computing device 102 might be a smartphone, tablet computer, or other mobile device that includes (1) hardware consisting of one or more low-power microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computing device 102 might include a web browser as an application program or part of an operating system. Examples of web browsers that might execute on personal computing device 102 if it is a laptop or other personal computer include Internet Explorer, Mozilla Firefox, Safari, and Google Chrome. Examples of browsers that might execute on personal computing device 102 if it is a smartphone, tablet computer, or other mobile device include Safari, Mozilla Firefox, Android Browser, and Palm webOS Browser. It will be appreciated that users of personal computing device 102 might use browsers to communicate with software running on the servers at website 103 and at website 106. Alternatively, users of personal computing device 102 might use other application programs to communicate with software running on the servers at website 103 and at website 106. For example, if the personal computing device 102 is a smartphone, tablet computer, or other mobile device, users might use an app or a hybrid app (e.g., an app written in Objective C or Java that includes embedded HTML5) to communicate with software running on the servers at website 103 and at website 106. It will be appreciated that an application program for a mobile device is often referred to as an "app".

Figure 2A:
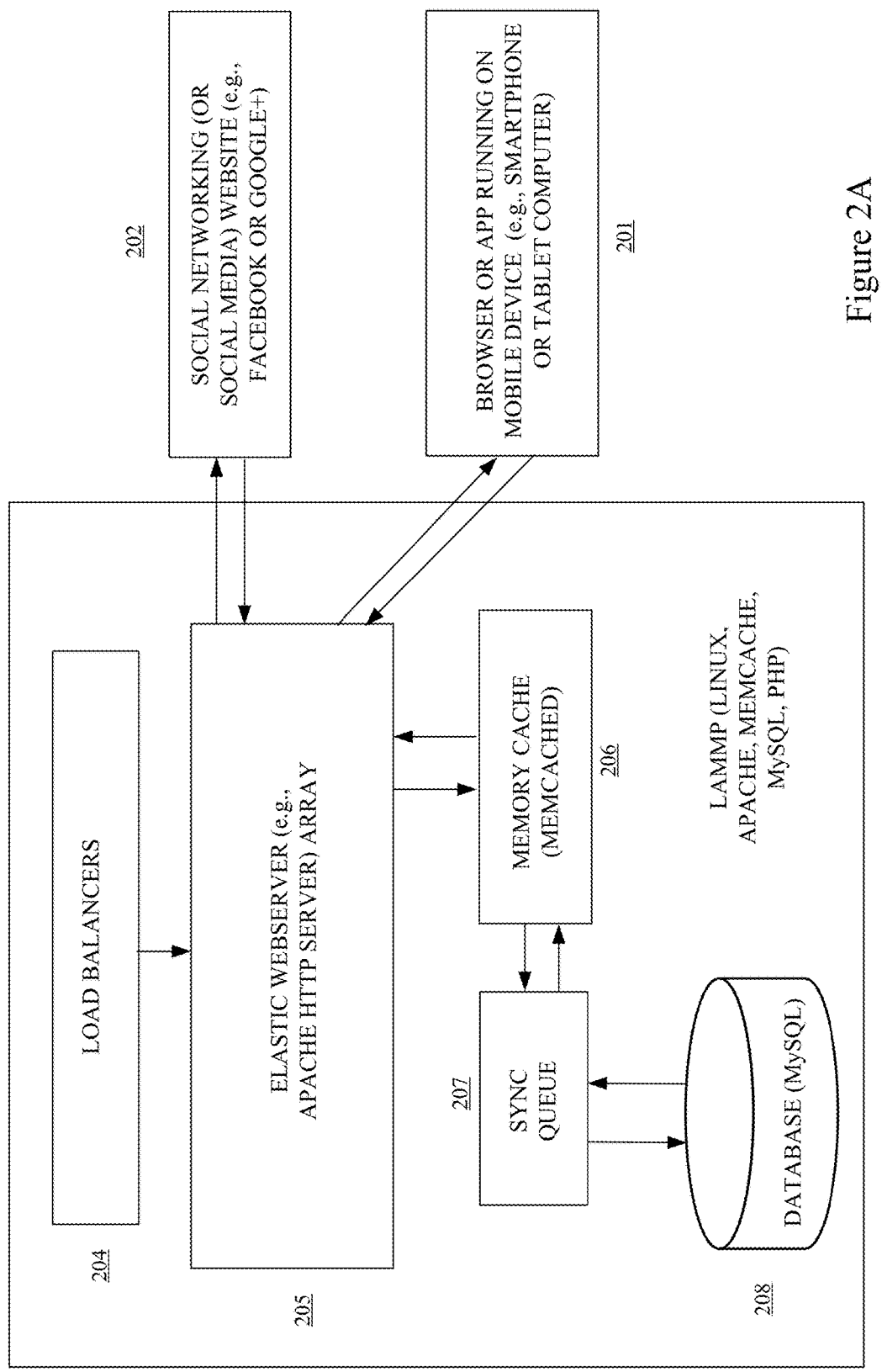
FIG. 2A is a functional software modularization, in accordance with an example embodiment.

FIG. 2A is a functional software modularization, in accordance with an example embodiment. As depicted in this figure, a player is using a web browser or app 201 on a mobile device (e.g., a smartphone or a tablet computer) to interact with server software 203 (e.g., transmit or receive game data) running on a website hosting an MMO game (e.g., running on the servers at website 103 in FIG. 1). In an example embodiment, server software 203 might be implemented using a public, private, or hybrid cloud platform, e.g., a hybrid cloud platform whose public cloud is Amazon Electric Compute Cloud (EC2) and whose private cloud is built using Cloud.com's CloudStack software. In an alternative example embodiment, server software 203 might be implemented using other public clouds and/or other private clouds that provide similar functionality. Or, server software 203 might be implemented without resort to third-party cloud platforms, e.g., using (a) OpenStack or (b) load balancing and virtualization software (e.g., Citrix XenServer, VMware, Microsoft, or Xen), distributed computing software (such as Hadoop, which implements Map-Reduce and/or the Google Filesystem), distributed memory-caching software (such as memcached), distributed key-value database software (such as Couchbase Server nee Membase Server), NoSQL database-management software, structured database-management software (such as MySQL), etc. Parenthetically, it will be appreciated that SQL is an acronym which stands for Structured Query Language.

Returning to FIG. 2A, server software 203 includes load balancers 204 (e.g., the load balancing and virtualization software provided by Citrix, VMware, Microsoft, or Xen) that balance the load between the servers (e.g., Apache HTTP servers) in an elastic (or dynamic) array 205. It will be appreciated that the array is elastic because its size can be increased to accommodate additional servers and decreased to accommodate fewer servers. As further depicted in FIG. 2A, the servers in the elastic array 205 transmit (e.g., using HTTP) data to and receive data from (a) the web browser or app 201 and (b) the servers on a social networking website 202 such as Facebook. In an example embodiment, the servers might read data from and write data to memory cache 206 (e.g., a memory cache created with memcached and managed with Couchbase Server), which, in turn, is backed by database 208, which might be MySQL. In an alternative example embodiment, the database 208 might be NoSQL. It will be appreciated that performance latencies can be significantly reduced by such a caching arrangement, which exploits locality of reference. It will also be appreciated that memory cache 104 in FIG. 1 corresponds to the memory cache 206 in FIG. 2 and the persistent storage 105 in FIG. 1 corresponds to the database 208 in FIG. 2A. In an example embodiment, synch queue 207 might receive the data from memory cache 206 to be written asynchronously to the database 208. As indicated on FIG. 2A, the functional software modularization depicted in the figure might be implemented as a LAMMP (Linux, Apache, Memcache, MySQL, PHP) architecture, in an example embodiment.

Figure 2B:
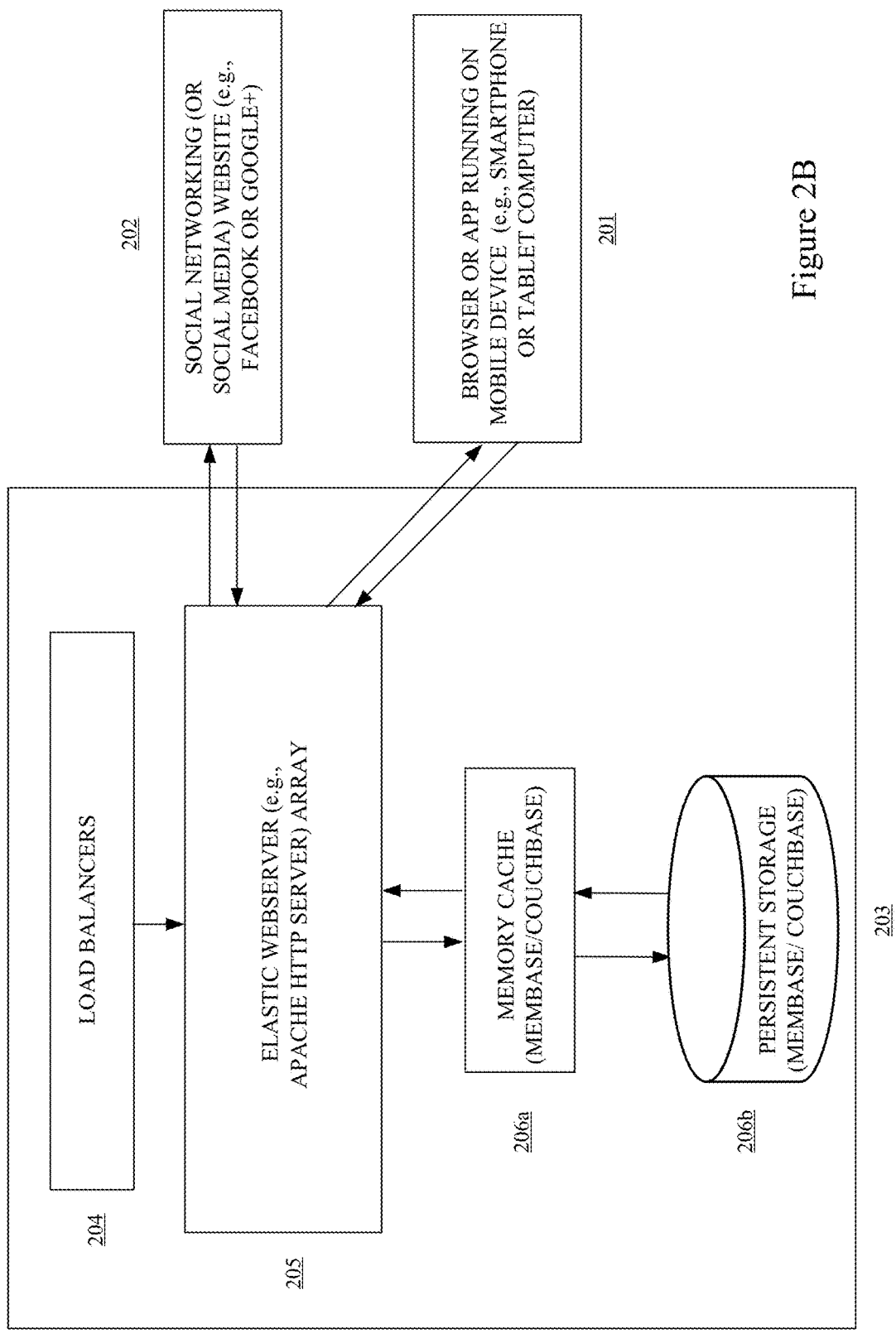
FIG. 2B is an alternative functional software modularization, in accordance with an example embodiment.

FIG. 2B is an alternative functional software modularization, in accordance with an example embodiment. As depicted in this figure, a player is using a web browser or app 201 on a mobile device (e.g., a smartphone or a tablet computer) to interact with server software 203 running on a website hosting an MMO game. In an example embodiment, server software 203 might be implemented using a public, private, or hybrid cloud platform. In an alternative example embodiment, server software 203 might be implemented using other public clouds and/or other private clouds that provide similar functionality. Or, server software 203 might be implemented without resort to third-party cloud platforms, e.g., using load balancing and virtualization software, distributed computing software, distributed memory-caching software, distributed key-value database software, NoSQL database-management software, structured database-management (e.g., SQL) software, etc.

In FIG. 2B, server software 203 includes load balancers 204 that balance the load between the servers in an elastic array 205. As further depicted in this figure, the servers in the elastic array 205 transmit data to and receive data from (a) the web browser or app 201 and (b) the servers on a social networking website 202 such as Facebook. In an example embodiment, the servers might read data from and write data to a hybrid in-memory database 206a and 206b which persists data (e.g., a hybrid in-memory database such as Membase/Couchbase Server).

Figure 3:
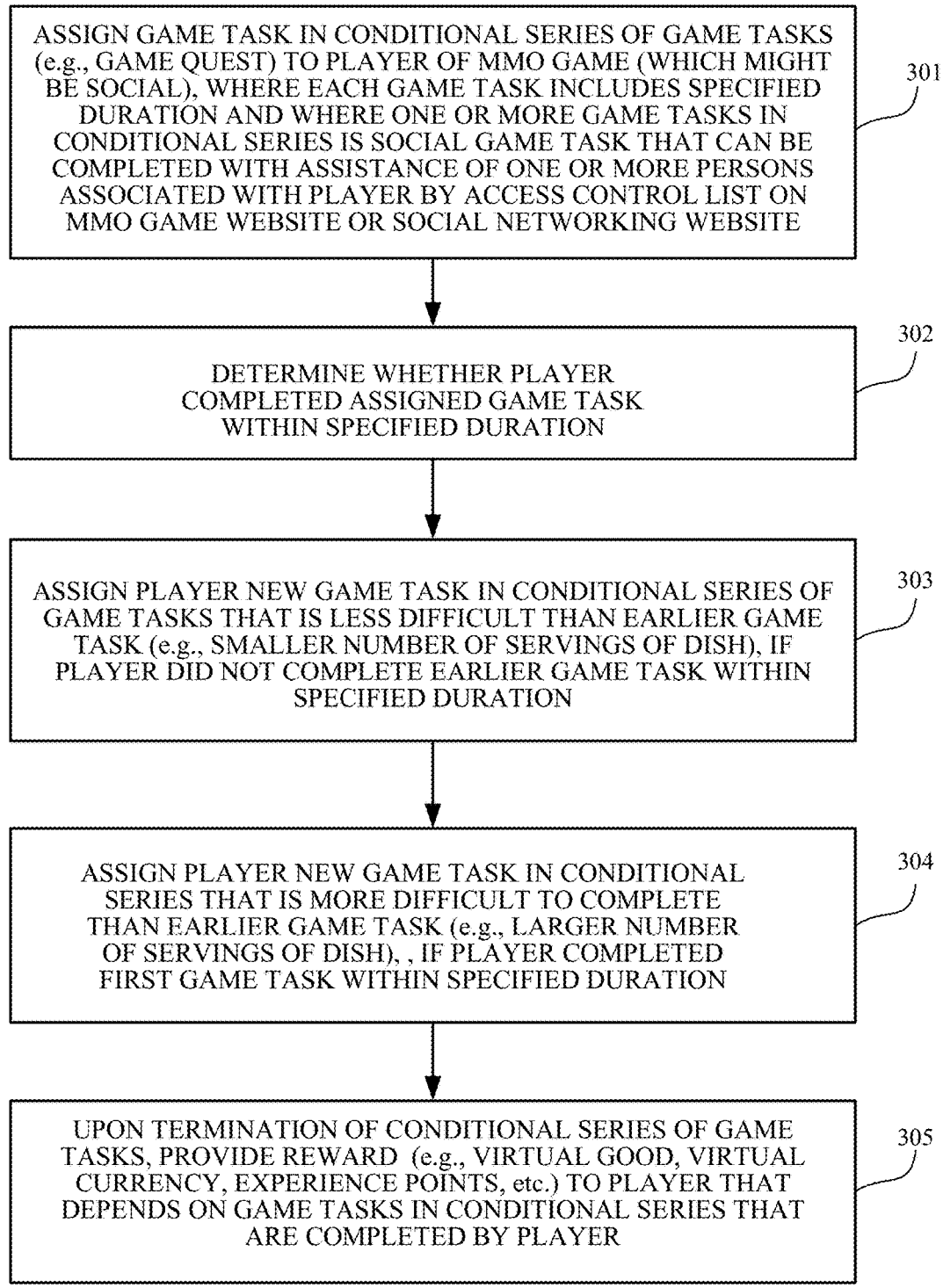
FIG. 3 is a flowchart diagram that illustrates a process for adaptively assigning tasks on the basis of task performance in an MMO game, in accordance with an example embodiment.

FIG. 3 is a flowchart diagram that illustrates a process for adaptively assigning game tasks on the basis of task performance in an MMO game (which might be social), in accordance with an example embodiment. In an example embodiment, one or more of the operations in this process might be performed by software (including software 203) running on servers at a website 103, e.g., a website hosting an MMO game such as Zynga. In an alternative example embodiment, one or more of the operations in these processes might be performed by software running on personal computing device 102, e.g., instructions in a webpage read by a browser supporting HTML5, CSS3, and JavaScript or instructions in a hybrid app with embedded HTML5 executing on a smartphone.

As depicted in FIG. 3, software running on one or more servers at website 103 (e.g., Zynga) assigns a game task in a conditional series of game tasks to a player of an MMO game, in operation 301. As used in this disclosure, a conditional series of game tasks (which might be one or more game tasks) is referred to as a "game quest" or a "game quest line" (which might include multiple game quests). Each game task in the series of game tasks includes a specified duration. Consequently, in some example embodiments, a game quest (or game quest line) might include a specified duration, e.g., a specified duration derived from the specified durations of the individual game tasks in the game quest (or game quest line). One or more of the game tasks in the conditional series might be a social game task that can be completed with the assistance of persons associated with the player by an access control list (ACL) on the MMO game website or a social networking website, e.g., the player's Facebook friends. For example, in the Zynga game Café World, a player might be tasked with requesting a virtual good such as a kitchen utensil from the player's friends (or neighbors) on a social network, possibly including friends who are not presently players of the MMO game. The software might facilitate such a request by broadcasting the request to the player's friends through the use of an application programming interface (API), which might be a web API, exposed by software running on a social networking website (e.g., website 106 in FIG. 1). Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile and the stream (e.g., Facebook News Feed) associated with that profile.

In operation 302, the software determines whether the player completed the assigned game task within the specified duration. And in operation 303, the software assigns the player a new game task in the conditional series of game tasks (e.g., a game quest or a game quest line) that is less difficult than the earlier game task (e.g., serving a smaller number of servings of a dish (e.g., "caramel apple") in Zynga's Café World), if the player did not complete the earlier game task within the specified duration. Or, in operation 304, the software assigns the player a new game task in the conditional series of game tasks (e.g., a game quest or a game quest line) that is more difficult than the earlier game task (e.g., serving a larger number of servings of a dish (e.g., "caramel apple") in Zynga's Café World), if the player completed the earlier game task within the specified duration. It will be appreciated that operations 303 and 304 are alternative operations that might be implemented using conditional logic, e.g., an "if-then-else" statement or a "case" statement. The operations are only numbered sequentially for purposes of identification. Then in operation 305, the software provides a reward to the player (e.g., virtual good such as a recipe, virtual currency such as Café Cash (CC) in Zynga's Café World, experience points, etc.) that depends on the game tasks in the conditional series that are completed by player, upon termination of the conditional series of game tasks (e.g., a game quest or a game quest line). In an example embodiment, the game mechanics for the MMO game might allow the player to use virtual currency (e.g., which can be purchased with real money, earned as a reward in an MMO game, received as a gift, etc.) to purchase completion of a game task that the player did not complete, e.g., so as to receive a full reward upon termination of the conditional series of game tasks (e.g., a game quest or a game quest line).

Figure 4A:
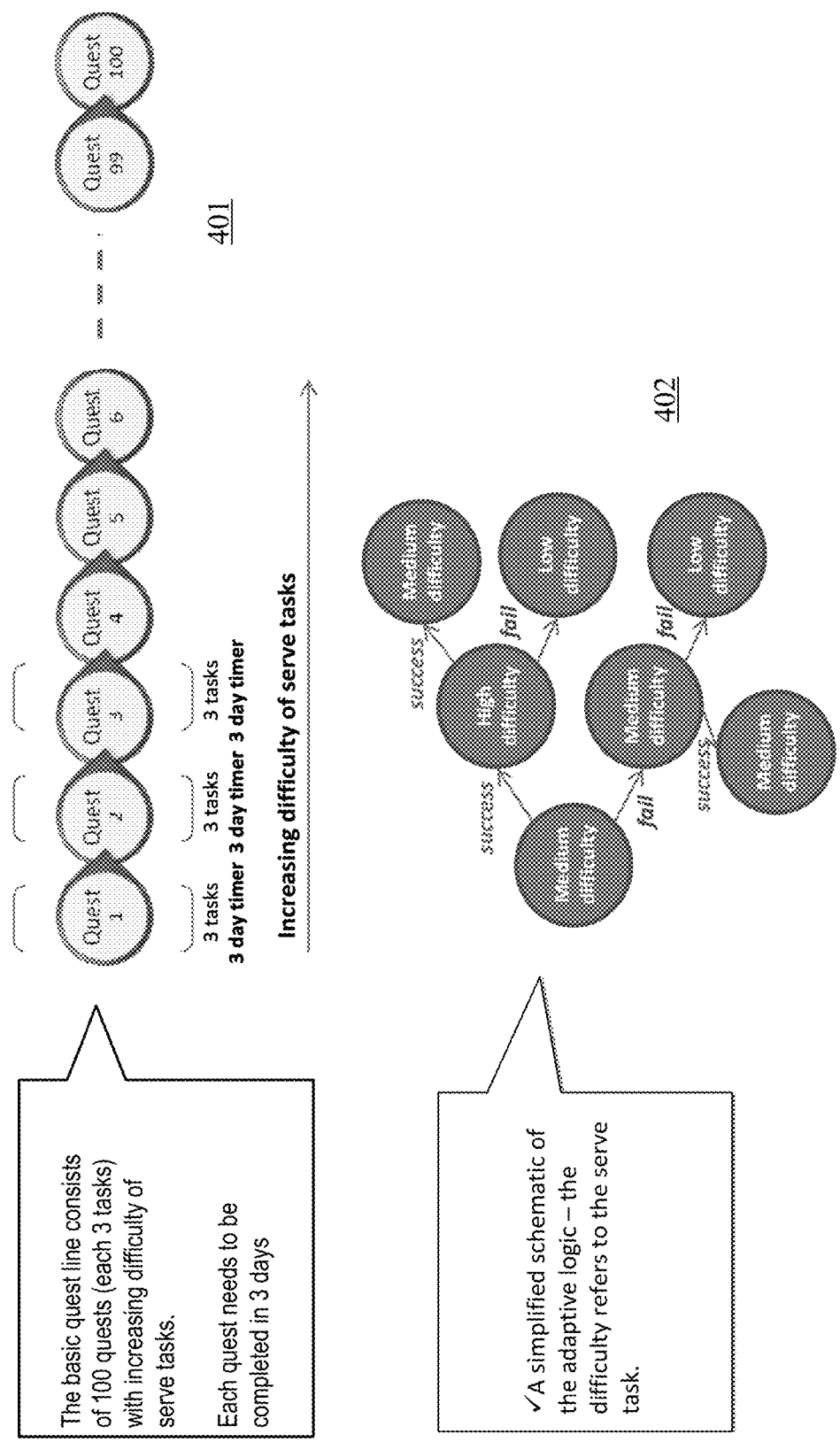
FIG. 4A is a simplified diagram that illustrates conditional logic for adaptively assigning tasks on the basis of task performance in an MMO game, in accordance with an example embodiment.

The conditional series of game tasks described in FIG. 3 might be represented as a deterministic finite state machine, where the inputs to the state machine are success and failure. Such a state machine is shown as 402 in FIG. 4A, where as indicated in the figure's callout, the difficulty of a game task refers to a "serve task" (e.g., Task 2 as described below), in an example embodiment. In another example embodiment, the difficulty of a game task might refer to (a) a serve task (e.g., Task 2 as described below) or (b) a social game task (e.g., Tasks 1 and/or Task 3 described below). Further, as depicted by the schematic 401 in FIG. 4A, each game task in the conditional series of game tasks might include several subtasks. That is to say, as shown in schematic 401, a "quest line" might consist of 100 conditional "quests", where each "quest" consists of three game tasks (or game subtasks) and has a specified duration of three days.

In an example embodiment, the software might automatically generate quests for such a quest line of 100 quests using a task taxonomy similar to the following, which relates to a Cook-A-Thon quest line in Zynga's Café World. As indicated above, each of the 100 quests in the quest line might include three game tasks. Task 1 in each quest might involve asking (e.g., using a social network as described above) for a number (e.g., 10+N, where N is described as below) of a particular part (or component) such as a post-card, e.g., a B part as further described below. This game task might be accomplished by receiving the part through a stream (e.g., Facebook's News Feed) on a social network. And completion of this game task might be purchased using virtual currency, e.g., 40+K Café Cash (CC), where K is further described below. Task 2 in each quest might involve reaching a level (e.g., level "m" equal to 1, 2, etc.) of mastery for a dish such as a caramel apple, e.g., dish A as further described below. Again, completion of this game task might be purchased using virtual currency, e.g., 60+K Café Cash (CC). Task 3 in each quest might involve asking for a number (e.g., 10+N) of a particular part (or component) such as recipe card, e.g., a C part as further described below. This game task might be accomplished by asking for the part, e.g., from a friend on a social network. And completion of this game task might be purchased using virtual currency, e.g., 40+K Café Cash (CC).

In an example embodiment, N increases by 1 for every 5 quests so that N would be 30 parts for the $100^{th}$ quest in the quest line. K increases by 5 for every 10 quests, so K for the $100^{th}$ quest would be 90 CC for Task 1, 110 CC for Task 2, and 90 CC for Task 3. Also, in an example embodiment, the purchase price for a game task that involves dishes (e.g., Task 2) might go up by 10 CC every 10 quests.

Also, in an example embodiment, Task 2 for Quest 1 might be to "Serve Caramel Apple 30 times". For Quests 2-100, Task 2 might be as follows: for even quests, reach level 1 mastery for dish A (where A might be the dish rewarded in the most recent quest as further described below); and, for odd quests, reach level 2 mastery for dish A (where A might be the dish rewarded in the most recent quest as further described below). For Parts B and C, the software might reuse ten different parts (2 per quest), repeating after every five quests.

Figure 4B:
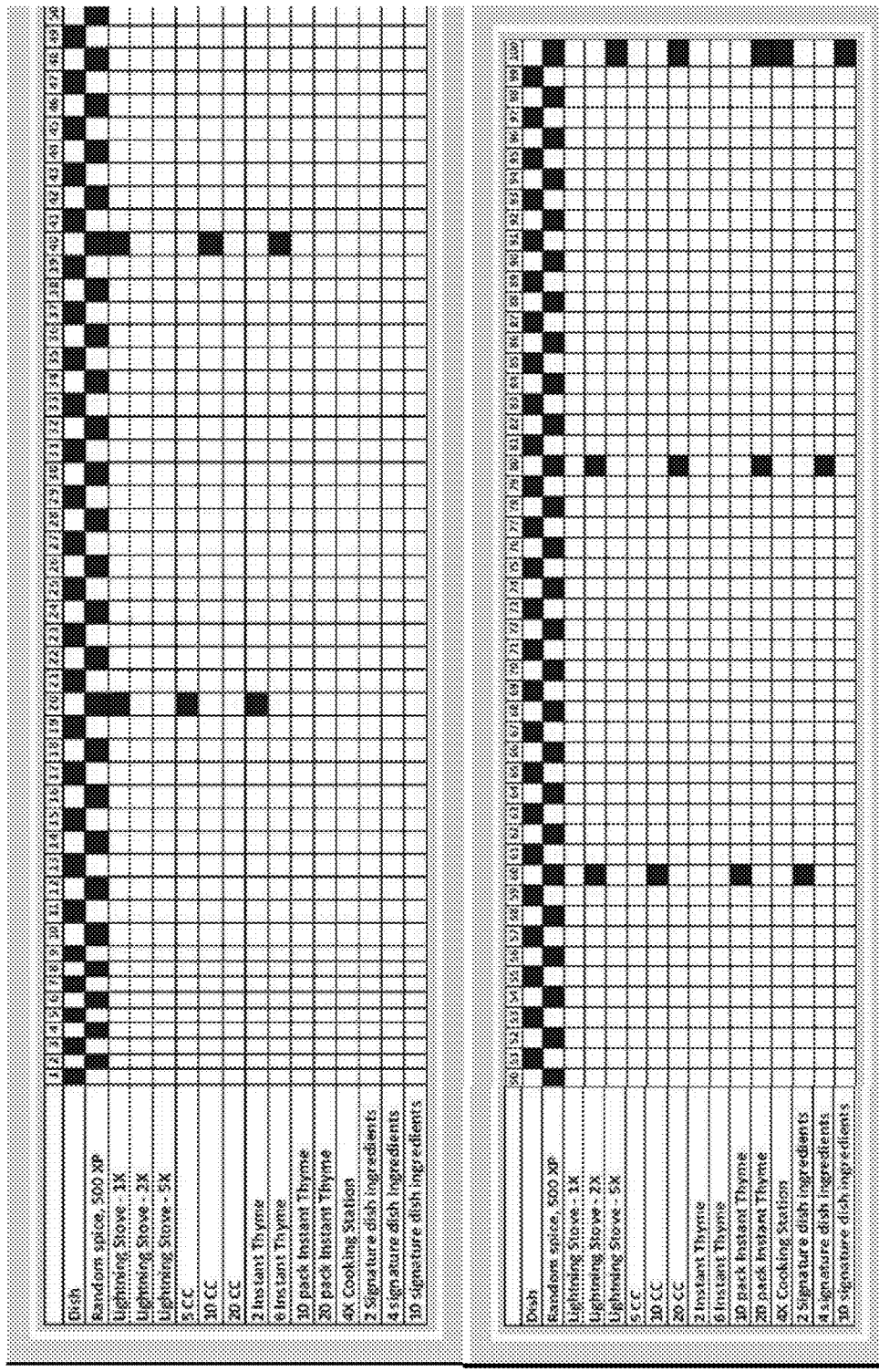
FIG. 4B is a reward table 403 that might be used with the task taxonomy, in accordance with an example embodiment.

In an example embodiment, if a player fails the previous dish goal (e.g., Task 2), the software might cycle through the following set of four dish goals (as a Task 2) that are less difficult anywhere in a quest line: (1) "Serve Chips and Guacamole 30 times"; (2) "Serve Super Chunk Fruit Salad 30 times"; (3) "Serve Bacon Cheeseburger 30 times"; and (4) Serve Caramel Apple 30 times". And if the player fails a mastery level 1 goal, the software might repeat this goal in the next quest. FIG. 4B shows a rewards table that might be used with the task taxonomy described above. The columns in the rewards table 403 are labeled with the quest number, e.g., from 1-100. The rows are labeled with rewards, e.g., (a) a dish to master as in the first row from the top of rewards table 403, or (b) "Random spice, 500 XP" in the second row from the top of rewards table 403, where XP stands for "experience points" and the random spice is awarded based on equal probability between Instant Thyme, Mastery Mint, Power Pepper, Super Salt, 1-hour Thyme, 6-hour Thyme and 12-hour Thyme in Zynga's Café World.

Figure 5:
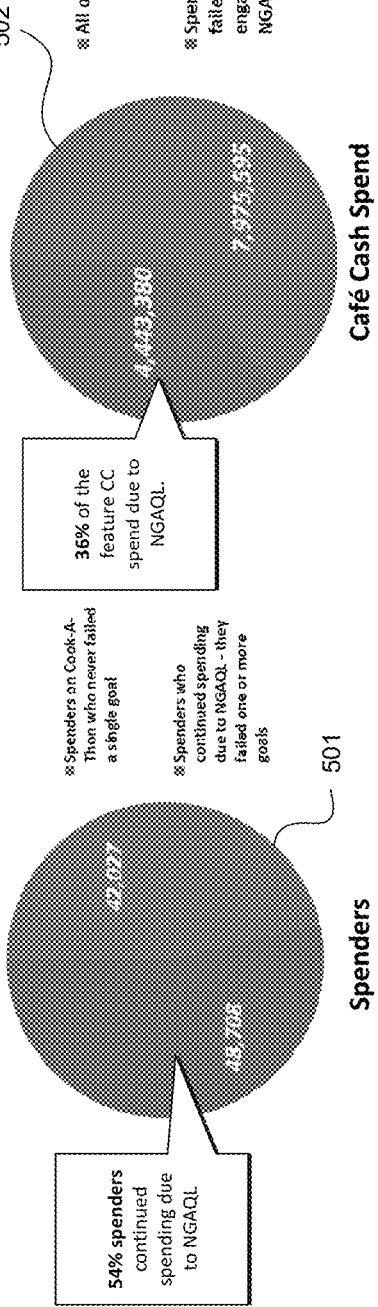
FIG. 5 is a group of charts showing the commercial success of adaptively assigned tasks on the basis of task performance in a social MMO game, in accordance with an example embodiment.
Figure 5:
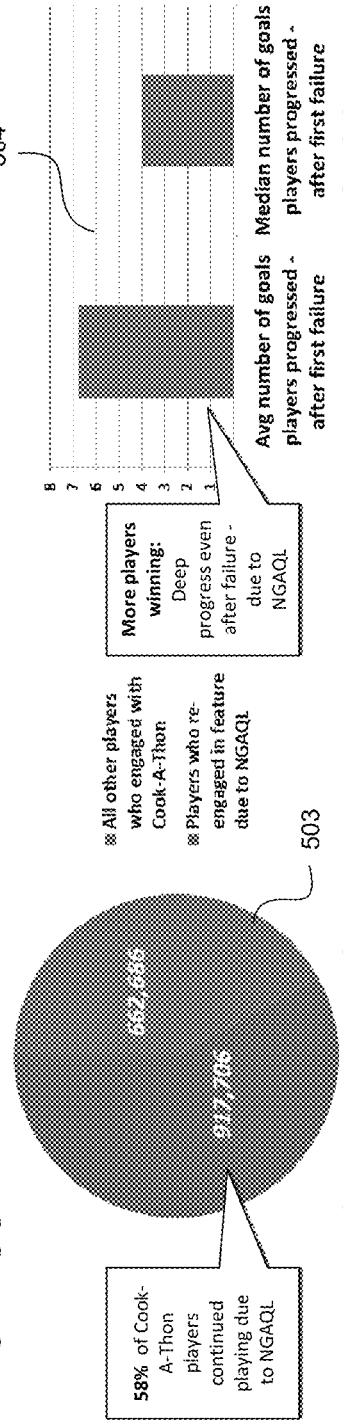

FIG. 5 is a group of charts showing the commercial success of adaptively assigned game tasks on the basis of task performance in an MMO game (which might be social), in accordance with an example embodiment. A used in this figure, NGAQL is an acronym for "non-gating adaptive quest line" which is depicted as the conditional series of game tasks 402 in FIG. 4. As shown in chart 501 in FIG. 5, of all the players who spent real money on virtual currency in a social MMO game with NGAQL (e.g., Cook-A-Thon quest line in Zynga's Café World), 54% did so after failing one or more game tasks. Similarly, as shown in chart 502 in FIG. 5, of all the players who spent Café Cash (which can be purchased with real money, earned as a reward in a Café World game, received as a gift, etc.) in a social MMO game with NGAQL (e.g., Cook-A-Thon quest line in Zynga's Café World), 36% did so after failing one or more game tasks.

Further, as shown in chart 503 in FIG. 5, of all the players who played (or engaged with) a social MMO game with NGAQL (e.g., Cook-A-Thon quest line in Zynga's Café World), 58% did so after failing one or more game tasks. And as shown in chart 504 in FIG. 5, for a player in a social MMO game with NGAQL (e.g., Cook-A-Thon quest line in Zynga's Café World), the average number of game tasks completed by the player after a first failed game task was over 6 and the median number of game tasks completed by the player after a first failed game task was approximately 4.

Figure 6A:
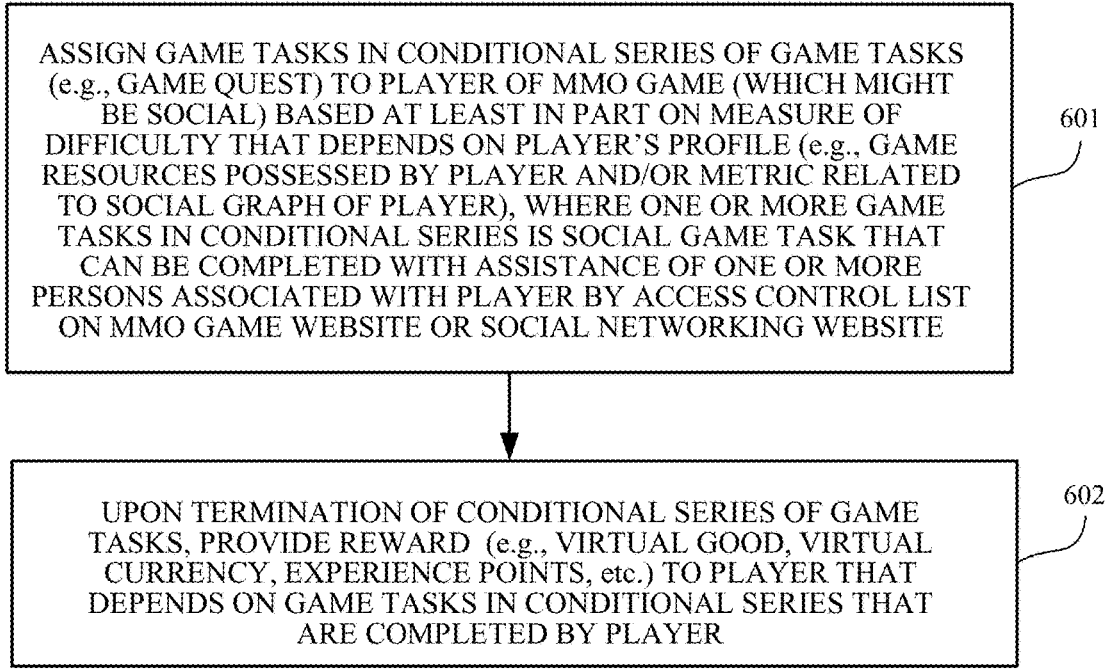
FIG. 6A is a flowchart diagram that illustrates a process for adaptively assigning tasks on the basis of player profile in an MMO game, in accordance with an example embodiment.

FIG. 6A is a flowchart diagram that illustrates a process for adaptively assigning game tasks on the basis of player profile in an MMO game (which might be social), in accordance with an example embodiment. In an example embodiment, one or more of the operations in this process might be performed by software (including software 203) running on servers at a website 103, e.g., a website hosting an MMO game such as Zynga. In an alternative example embodiment, one or more of the operations in these processes might be performed by software running on personal computing device 102, e.g., instructions in a webpage read by a browser supporting HTML5, CSS3, and JavaScript or instructions in a hybrid app with embedded HTML5 executing on a smartphone.

As depicted in FIG. 6A, software running on one or more servers at website 103 (e.g., Zynga) assigns game tasks in a conditional series of game tasks (e.g., a game quest or a game quest line) to a player of an MMO game based at least in part on a measure of difficulty that depends on the player's profile, e.g., the game resources possessed by player and/or a metric related to a social graph of the player, in operation 601. One or more of the game tasks in the conditional series might be a social game task that can be completed with the assistance of persons associated with the player by an ACL on the MMO game website or a social networking website, e.g., the player's Facebook friends. For example, in the Zynga game Café World, a player might be tasked with requesting a virtual good such as a kitchen utensil from the player's friends on a social network, possibly including friends who are not presently players of the MMO game. Here again, the software might facilitate such a request by broadcasting the request to the player's friends through the use of an API exposed by software running on a social networking website (e.g., website 106 in FIG. 1).

In operation 602, the software provides a reward to the player (e.g., virtual good such as a recipe, virtual currency, experience points, etc.) that depends on the game tasks in the conditional series that are completed by player, upon termination of the conditional series of game tasks (e.g., a game quest or a game quest line). In an example embodiment, the game mechanics for the MMO game might allow the player to use virtual currency to purchase completion of a game task that the player did not complete, e.g., so as to receive a full reward upon termination of the conditional series of game tasks (e.g., a game quest or a game quest line).

As indicated above, the measure of difficulty used to assign tasks in FIG. 6A depends on the player's profile. In an example embodiment, the player's profile might include data related to such things as: (1) the game resources possessed by the player, e.g., stove burners (or stove tops) and/or stove speed in the Zynga game Café World: (2) the player's game-task completion (or performance) history in the current MMO game and/or other MMO games, e.g., as measured by player level in terms of experience points; (3) an online social graph associated with the player or a metric related to such a social graph; and (4) the game tasks that have already been assigned to the player. An example of such a metric is active social network (ASN) for a player. In an alternative example embodiment, the measure of difficulty might also depend on the player profiles of other players who are on a team with the player, e.g., a team performing a collaborative game task.

In an example embodiment, ASN might be a count of the friends (e.g., as determined by an ACL on a MMO game website and/or a social networking website) of the player with whom the player has had a reciprocal (or closed) interaction loop within a duration window that is within a recency period. In an example embodiment, a reciprocal (or closed) interaction loop might involve (1) an initial message and a response message or (2) an initial message and an action in response to the message, e.g., a visit to a private game space and/or a corresponding action there. An example of the latter is a visit to a restaurant and trying a daily special, in the Zynga game Café World. So if the player has sent a message (e.g., a message pursuant to a messaging protocol such as email, instant messaging, SMS, etc., that might include text, images, audio/video, etc.) to a friend and the friend has responded with a message within a specified duration window (e.g., one week after the initial message is sent), that friend might be included in the count, assuming the duration window is within a specified recency period (e.g., one week from the time of counting). Likewise, if the friend has sent a message to the player and the player has responded with a visit to the friend's private game space and a corresponding action there within a specified duration window (e.g., one week after the message is sent), that friend might be included in the count, assuming the duration window is within a specified recency period (e.g., one week from the time of counting).

In an example embodiment, the ASN count might include friends of the player who are players of the MMO game (which might be social) at the MMO game website and friends who are players of other MMO games (which might be social) at the MMO game website. Alternatively, the ASN count might include the friends the player on a social networking website, regardless of whether they are players of the MMO game or other MMO games. Likewise, in an example embodiment, the message sent to a friend or to a player might relate to the MMO game or other MMO games, in order to qualify as a message for purposes of an ASN count. In an alternative example embodiment, the message sent to a friend or to a player might qualify as a message for purposes of an ASN count, regardless of the subject matter of the message. In still other example embodiments, the ASN count might be adjusted to reflect the type of message sent. For example, a reciprocal (or closed) interaction loop might be discounted (e.g., by a fraction/decimal less than 1), if the initial message is a template message provided by the MMO game and the message is sent in response results from a click on a graphical user interface (GUI) control on the template message. And a reciprocal (or closed) interaction loop might be multiplied/amplified (e.g., by a fraction/decimal greater than 1), if the initial message and/or the message is sent in response is a personal message, e.g., not a template message.

In an alternative example embodiment, ASN might be a count of friends (e.g., as determined by an ACL on a MMO game website and/or a social networking website) of the player who are daily active users (DAUs) of the MMO or other MMO games within a recency period time (e.g., a week). And a user might be considered to be active if the user has initiated a game task, which might be a social game task, within the recency period. For example, if the game task is a social game task, a user might be classified as an active user if the user has sent a message related to the MMO game to a friend, within the recency period.

In an example embodiment, the game resources possessed by a player might determine (e.g., on a linear basis between a specified minimum and a specified maximum or on a step-function basis) the number of task units assigned to a player in a game task. Thus, in a game like Café World, a player might be assigned a game task of 3 servings of a particular dish within 3 hours, if the player has an inventory of 3 burners (or stove tops), whereas a player with only 1 burner (or stove top), might be assigned a game task of only 1 serving of the particular dish within 3 hours. Similarly, in an example embodiment, the ASN of a player might determine (e.g., on a linear basis between a specified minimum and a specified maximum or on a step-function basis) the number of "friend" (as determined by an ACL) requests assigned to a player in a game task that is social.

It will also be appreciated that the conditional series of game tasks (e.g., a game quest or a game quest line) described in FIG. 6A might differ from one player to another in contrast to the conditional series of game tasks 402 in FIG. 4. For example, the initial game task for a player with many game resources might be different from the initial game task for a player with fewer game resources. Thus, the latter player might never be assigned any of the game tasks assigned to the former player. And consequently, in an example embodiment, players might be assigned rewards based on the level of difficulty associated with the game tasks they have completed. For example, a player might be assigned a combined score that depends on difficulty values assigned to the non-social game tasks that the player has completed and difficulty values assigned to the social game tasks that the player has completed. Then the combined scores for all of the players of the MMO game might be used to create a distribution of scores with a specified number of intervals which determine a corresponding number of rewards for the players of the MMO game (e.g., a player whose combined score is in the highest interval will receive the best reward).

Figure 6B:
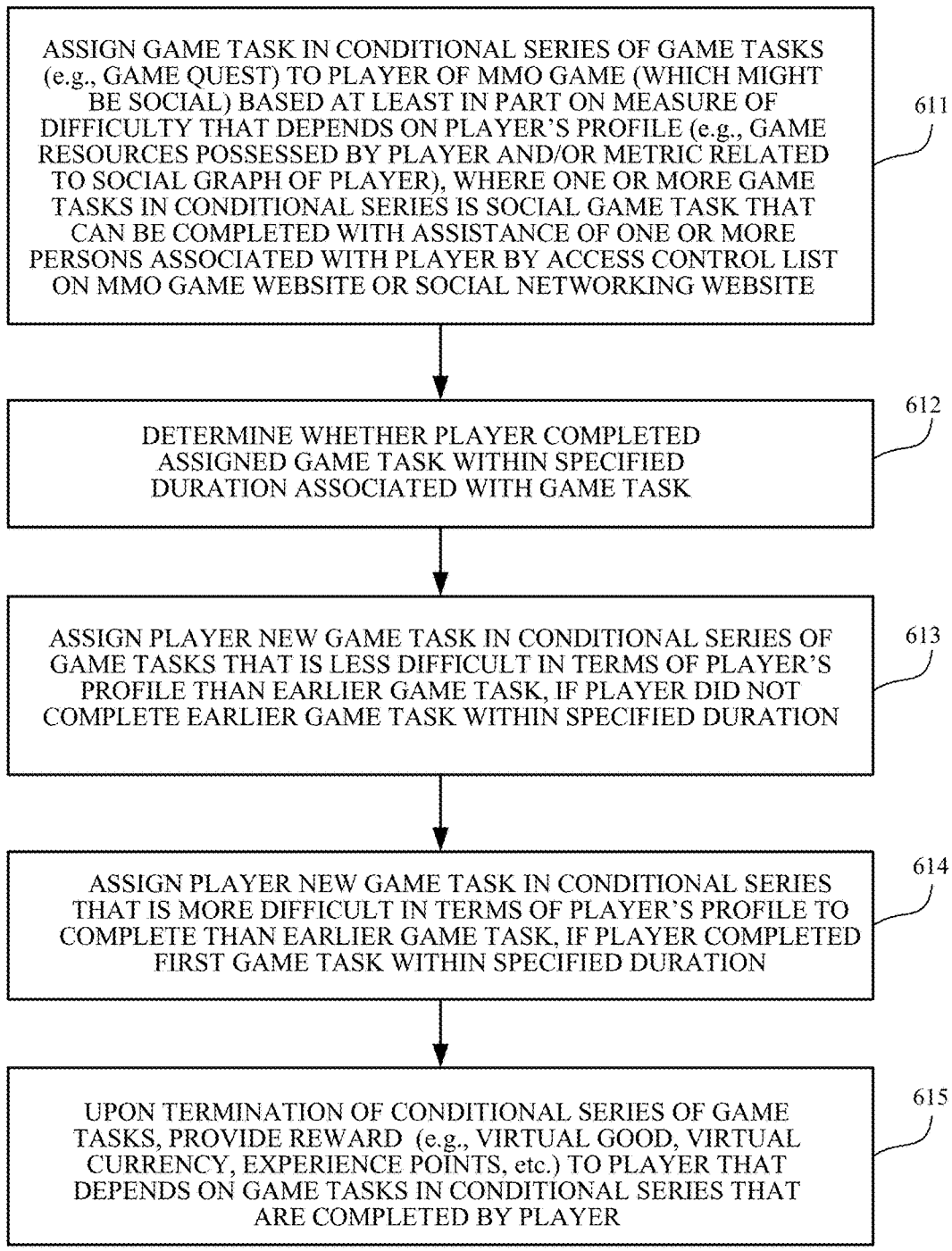
FIG. 6B is a flowchart diagram that illustrates a process for adaptively assigning tasks on the basis of task performance and player profile in an MMO game, in accordance with an example embodiment.

FIG. 6B is a flowchart diagram that illustrates a process for adaptively assigning game tasks on the basis of task performance and player profile in an MMO game (which might be social), in accordance with an example embodiment. In an example embodiment, one or more of the operations in this process might be performed by software (including software 203) running on servers at a website 103, e.g., a website hosting an MMO game such as Zynga. In an alternative example embodiment, one or more of the operations in these processes might be performed by software running on personal computing device 102, e.g., instructions in a webpage read by a browser supporting HTML5, CSS3, and JavaScript or instructions in a hybrid app with embedded HTML5 executing on a smartphone.

As depicted in FIG. 6B, software running on one or more servers at website 103 (e.g., Zynga) assigns a game task in a conditional series of game tasks (e.g., a game quest or a game quest line) to a player of an MMO game based at least in part on a measure of difficulty that depends on the player's profile, e.g., the game resources possessed by player and/or a metric related to a social graph of the player, in operation 611. One or more of the game tasks in the conditional series might be a social game task that can be completed with the assistance of persons associated with the player by an ACL on the MMO game website or a social networking website, e.g., the player's Facebook friends. For example, in the Zynga game Café World, a player might be tasked with requesting a virtual good such as a kitchen utensil from the player's friends on a social network, possibly including friends who are not presently players of the MMO game. Here again, the software might facilitate such a request by broadcasting the request to the player's friends through the use of an API exposed by software running on a social networking website (e.g., website 106 in FIG. 1).

In operation 612, the software determines whether the player completed the assigned game task within a specified duration associated with the game task. And in operation 613, the software assigns the player a new game task in the conditional series of game tasks (e.g., a game quest or a game quest line) that is less difficult in terms of the player's profile than the earlier game task (e.g., serving a smaller number of servings of a dish (e.g., "caramel apple") in Zynga's Café World), if the player did not complete the earlier game task within the specified duration. Or, in operation 614, the software assigns the player a new game task in the conditional series of game tasks (e.g., a game quest or a game quest line) that is more difficult in terms of the player's profile than the earlier game task (e.g., serving a larger number of servings of a dish (e.g., "caramel apple") in Zynga's Café World), if the player completed the earlier game task within the specified duration. Here again, it will be appreciated that operations 613 and 614 are alternative operations that might be implemented using conditional logic, e.g., an "if-then-else" statement or a "case" statement. The operations are only numbered sequentially for purposes of identification. In operation 615, the software provides a reward to the player (e.g., virtual good such as a recipe, virtual currency, experience points, etc.) that depends on the game tasks in the conditional series that are completed by player, upon termination of the conditional series of game tasks (e.g., a game quest or a game quest line). In an example embodiment, the game mechanics for the MMO game might allow the player to use virtual currency to purchase completion of a game task that the player did not complete, e.g., so as to receive a full reward upon termination of the conditional series of game tasks (e.g., a game quest or a game quest line).

As indicated above, the measure of difficulty used to assign game tasks in FIG. 6B depends on the player's profile. Here again, in an example embodiment, the player's profile might include data related to such things as: (1) the game resources possessed by the player, e.g., stove burners (or stove tops) and/or stove speed in the Zynga game Café World; (2) the player's game-task completion (or performance) history in the current MMO game and/or other MMO games, e.g., as measured by player level in terms of experience points; (3) an online social graph associated with the player or a metric related to such a social graph; and (4) the game tasks that have already been assigned to the player. An example of such a metric is active social network (ASN) for a player, as described above. In an alternative example embodiment, the measure of difficulty might also depend on the player profiles of other players who are on a team with the player, e.g., a team performing a collaborative game task.

Here again, in an example embodiment, the game resources possessed by a player might determine (e.g., on a linear basis between a specified minimum and a specified maximum or on a step-function basis) the number of task units assigned to a player in a game task. Thus, in a game like Café World, a player might be assigned a game task of 3 servings of a particular dish within 3 hours, if the player has an inventory of 3 burners (or stove tops), whereas a player with only 1 burner (or stove top), might be assigned a game task of only 1 serving of the particular dish within 3 hours. Similarly, in an example embodiment, the ASN of a player might determine (e.g., on a linear basis between a specified minimum and a specified maximum or on a step-function basis) the number of "friends" (as determined by an ACL) requests assigned to a player in a game task that is social.

It will be appreciated that the assignment operations 611 and 613-614 involve a forms of player personalization. In an example embodiment, the software might only use the player personalization described in operation 611, without the player personalization described in operations 613-614, as depicted in FIG. 6B. That is to say, regardless of whether a player completes an assigned game task within the specified duration, if any, associated with the game task, the software might assign game tasks to the player based at least in part on a measure of difficulty that depends on the player's profile, as described above with reference to FIG. 6A.

It will also be appreciated that the conditional series of game tasks (e.g., a game quest or a game quest line) described in FIG. 6B might differ from one player to another in contrast to the conditional series of game tasks 402 in FIG. 4. For example, the initial game task for a player with many game resources might be different from the initial game task for a player with fewer game resources. Thus, the latter player might never be assigned any of the game tasks assigned to the former player. And consequently, in an example embodiment, players might be assigned rewards based on the level of difficulty associated with the game tasks they have completed. For example, a player might be assigned a combined score that depends on difficulty values assigned to the non-social game tasks that the player has completed and difficulty values assigned to the social game tasks that the player has completed. Then the combined scores for all of the players of the MMO game might be used to create a distribution of scores with a specified number of intervals which determine a corresponding number of rewards for the players of the MMO game (e.g., a player whose combined score is in the highest interval will receive the best reward).

FIG. 7A is a table showing the spending effects of adaptively assigning social game tasks on the basis of Active Social Network (ASN), in accordance with an example embodiment. In an experiment, a test group of players of an MMO game (e.g., Zynga's Café World) were dynamically assigned social game tasks in a conditional series of game tasks (e.g., a game quest or a game quest line) on the basis of ASN, using a process analogous to the process shown in FIG. 6A. According to the heuristic used in the experiment, the number of social game tasks assigned to a player varied linearly between a minimum and a maximum, based on the player's ASN. Rewards were scaled similarly. Thus, a player with a smaller ASN would receive fewer social game tasks (but not less than a minimum) than a player with a larger ASN. And the player with the smaller ASN would receive a smaller reward upon task completion than a player with a larger ASN upon task completion. It will be recalled that a social game task is a game task that can be completed with the assistance of persons associated with the player by an ACL on the MMO game website or a social networking website, e.g., the player's Facebook friends. The control group of players did not have their social game tasks dynamically assigned. As shown in table 701 in FIG. 7A, the cash (or real money) spent by the test group (labeled "dynamic") was significantly higher than the cash (or real money) spent by the control group, when the ASN included 0 friends, 1-10 friends, 11-20 friends, 21-30 friends, and 41-50 friends. Similarly, as shown in table 701, the cash spent per starter by the test group (labeled "dynamic") was significantly higher than the cash spent per starter by the control group, when the ASN included 0 friends, 1-10 friends, 11-20 friends, 21-30 friends, and 41-50 friends. A "starter" is a player who starts (or begins) a conditional series of game tasks (e.g., a game quest or a game quest line).

Figure 7B:
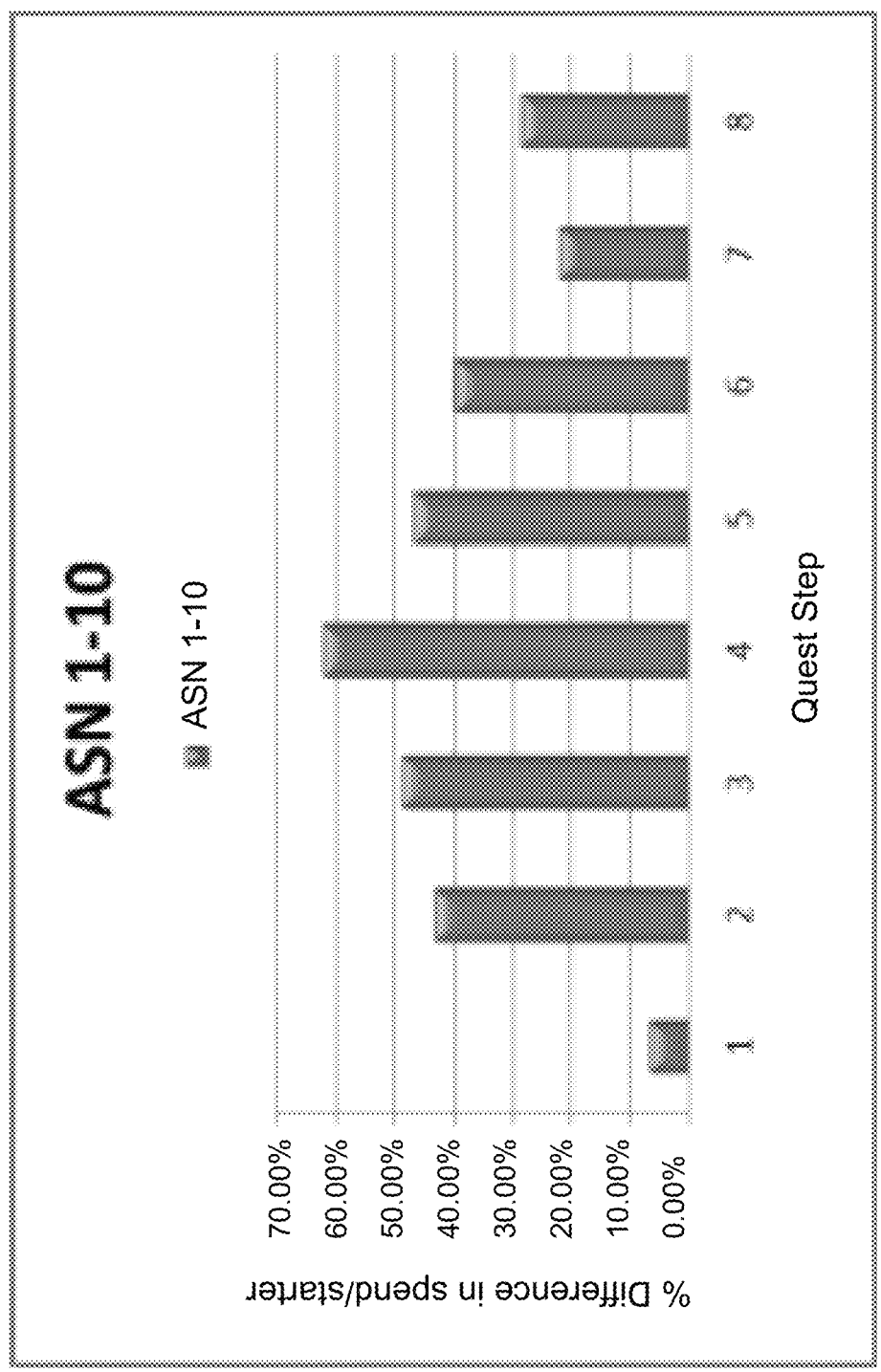
FIGS. 7B and 7C are charts showing the spending effects of adaptively assigning social game tasks on the basis of Active Social Network (ASN), in accordance with an example embodiment.
Figure 7C:
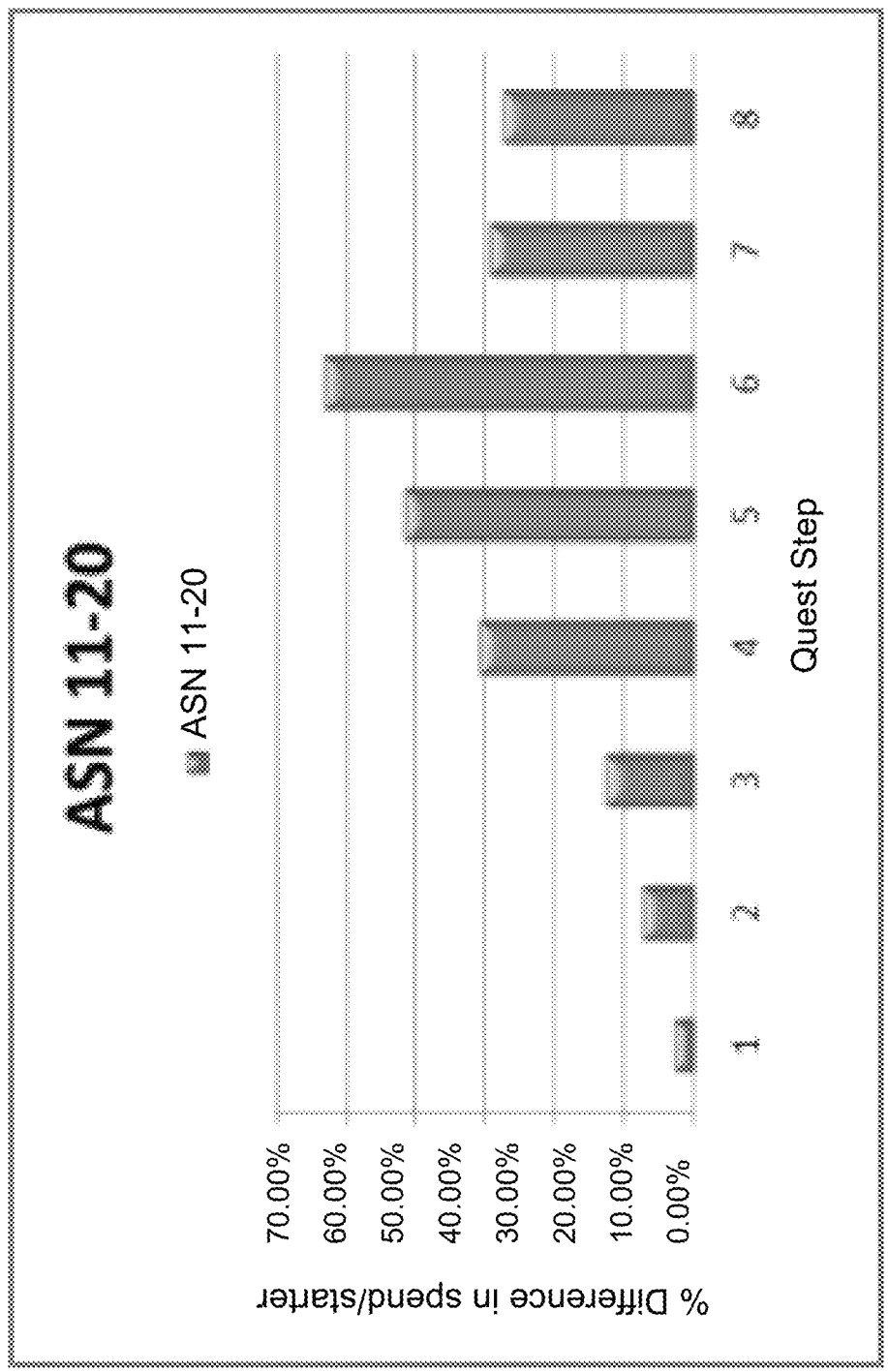

FIGS. 7B and 7C are charts showing the spending effects of adaptively assigning social game tasks on the basis of ASN, in accordance with an example embodiment. These charts pertain to the same experiment described by table 701 in FIG. 7. As shown by chart 702 in FIG. 7B, there was a 48% difference in cash spent per starter between the test and control groups when the ASN included 1-10 friends. That is to say, the cash spent per starter for the test group was 48% higher than the cash spent per starter in the control group. Similarly, as shown by chart 703 in FIG. 7C, there was a 19% difference in cash spent per starter between the test and control groups when the ASN included 11-20 friends. That is to say, the cash spent per starter for the test group was 19% higher than the cash spent per starter in the control group.

Figure 8:
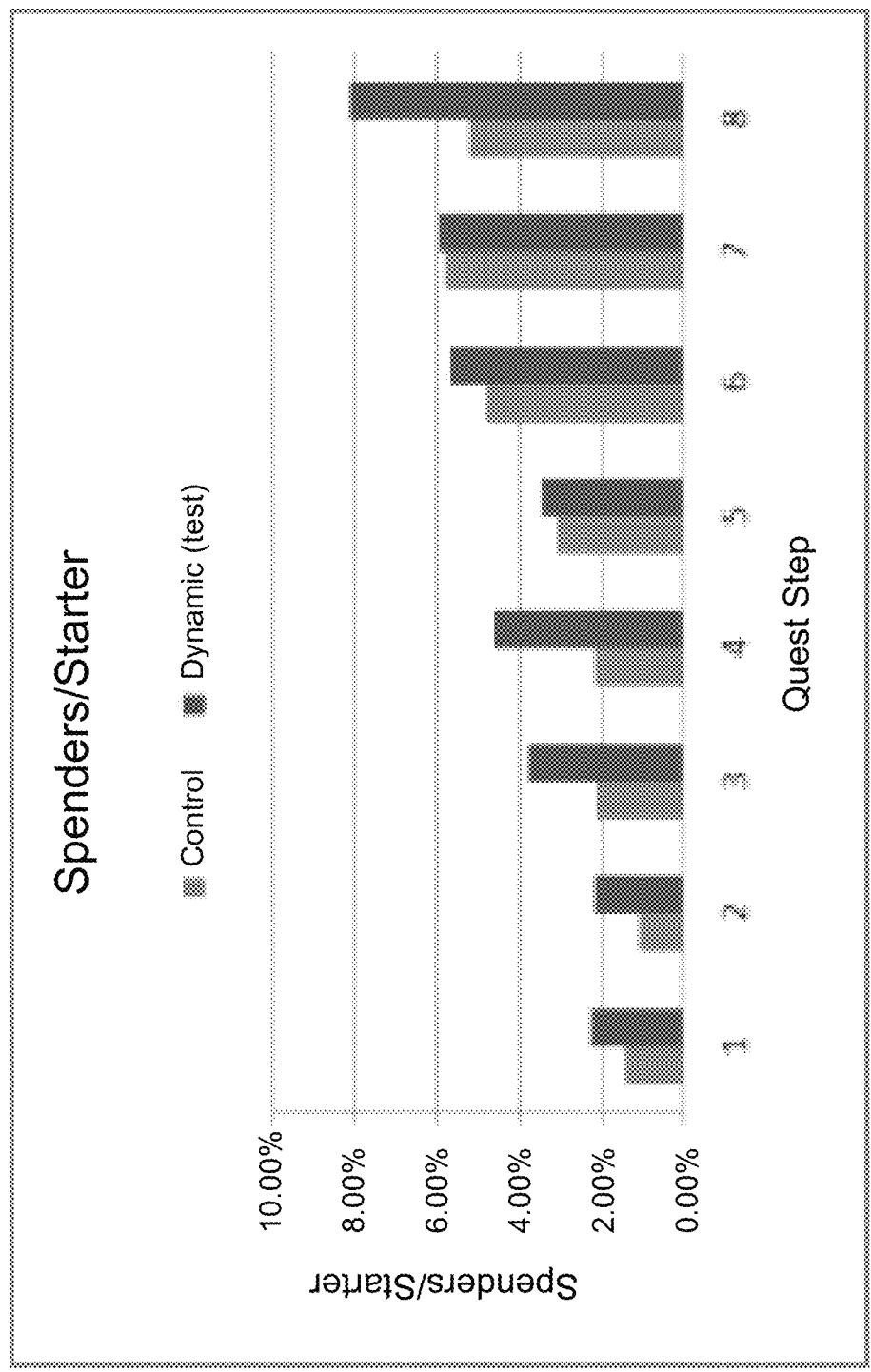
FIG. 8 is another chart showing the spending effects of adaptively assigning social game tasks on the basis of Active Social Network (ASN), in accordance with an example embodiment.

FIG. 8 is another chart showing the spending effects of adaptively assigning social game tasks on the basis of ASN, in accordance with an example embodiment. This chart also pertains to the same experiment described by table 701 in FIG. 7. In chart 801 in FIG. 8, the leftmost bar for each quest step (e.g., quest in a quest line) represents the control group and the rightmost bar for each quest step represents the test group. For each of the eight quest steps shown in the chart, the percentage of spenders per starters was greater for the test group than the control group. A spender is a starter who spends cash.

In conclusion, FIGS. 7A, 7B, 7C, and 8 show that cash spending on an MMO game can be increased by dynamically assigning fewer social game tasks to a player with a smaller ASN.

Figure 9A:
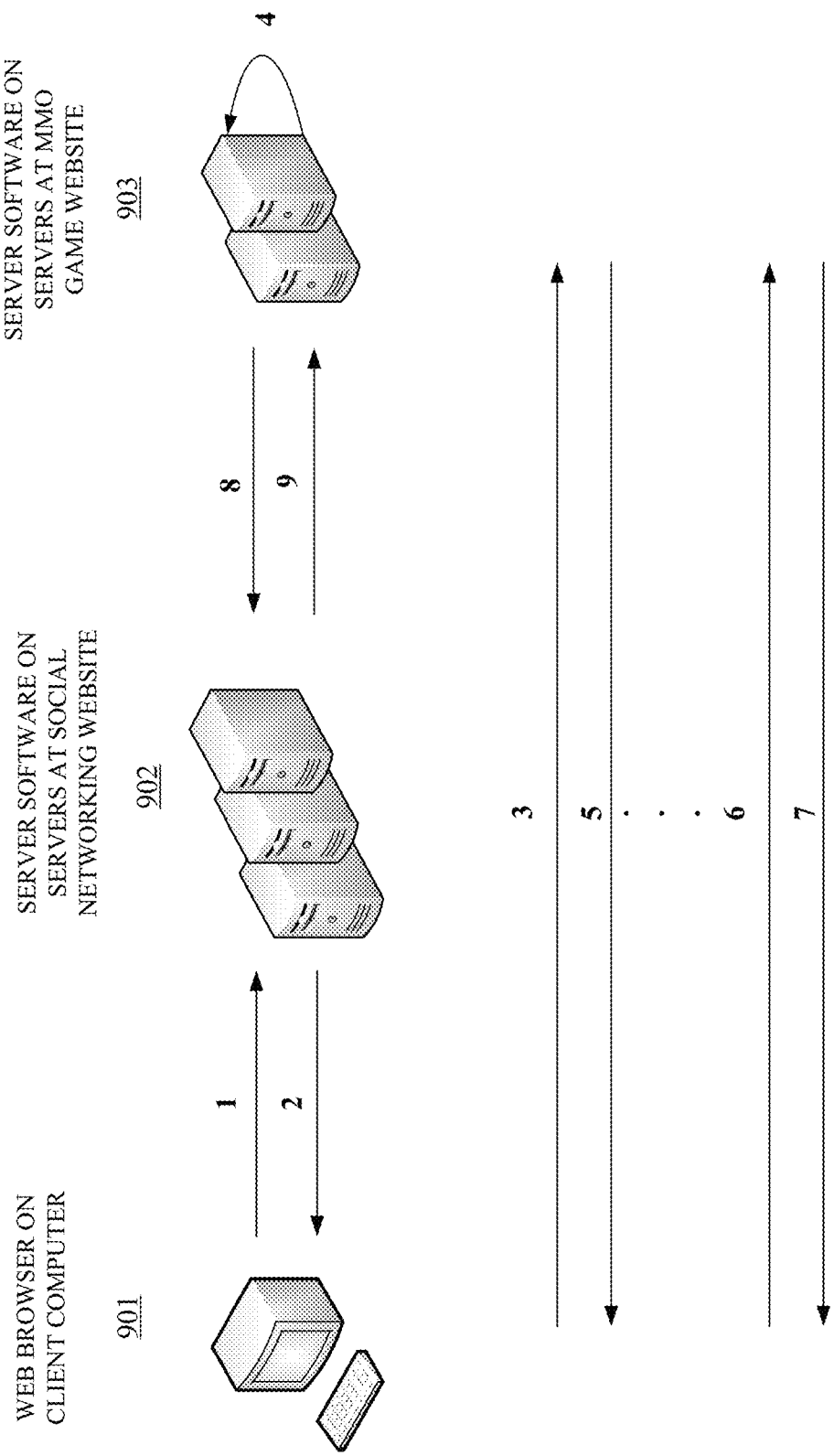
FIG. 9A is a simplified diagram that illustrates a sequence of transmissions associated with a social game task in an MMO game accessed from a social networking website, in accordance with an example embodiment.

FIG. 9A is a simplified diagram that illustrates a sequence of transmissions associated with a social game task in an MMO game accessed from a social networking website, in accordance with an example embodiment. As depicted in this diagram, a player has used a browser 901 on a personal computing device to log onto a social networking website, e.g., server software 902 (e.g., Facebook). However, many of the transmissions described in this figure and FIG. 9B might also occur if a player using a smartphone were to run a hybrid app written in Objective C or Java that includes embedded HTML5.

In operation 1, the player clicks on a graphic for a social MMO game, causing browser 901 to transmit an HTTP request to server software 902 (e.g., Facebook) for the game's initial web page. In operation 2, server software 902 (e.g., Facebook) returns an HTML5 and JavaScript (JS) web page consisting of an iFrame (e.g., Facebook "chrome") and an iFrame HTML tag for the game's initial web page. In operation 3, the browser uses the HTML tag to transmit a request to server software 903 (e.g., Zynga) for the game's initial web page to display inside the iFrame. The game's initial web page might be an application server page (e.g., PHP 5) or an HTML5 page. In operation 4, the application server page executes on server software 903 (e.g., Zynga), resulting in requests to databases and other servers as needed to complete generation of the web page, including possibly an HTTP request (not shown) transmitted to an API exposed by server software 902 (e.g., Facebook). In operation 5, the server software 903 (e.g. Zynga) returns the game's initial web page (e.g., HTML5 and JS) for the browser to display in the iFrame.

At some point thereafter, in operation 6, the player clicks on a graphic (e.g., representing a graphical user interface or GUI widget) on a game web page (e.g., HTML5 and JS), causing browser 901 to transmit an HTTP request to server software 903 (e.g., Zynga), requesting assistance with a social game task (e.g., requesting a kitchen utensil from the player's friends on a social network, possibly including friends who are not presently players of the MMO game). In operation 7, the server software 903 (e.g. Zynga) returns a web page (e.g., HTML5 and JS) to the browser indicating that the request was received. In operation 8, the server software 903 (e.g., Zynga) transmits an HTTP request to an API exposed by server software 902 (e.g., Facebook), posting the request for assistance with a social game task to the profiles (e.g., through a Facebook notification) and/or streams of the requesting player's friends on the social network managed by server software 902 (e.g., Facebook). It will be appreciated that in order to access the friends' profiles and/or streams (e.g., using an access token), the server software 903 (e.g., Zynga) might have earlier obtained permission from the friends, e.g., when they joined the game or other Zynga games. Then in operation 9, server software 902 (e.g., Facebook) sends a response, e.g., in Java Script Object Notation (JSON), to server software 903 (e.g., Zynga) describing the success or failure of the posting to each profile and/or stream.

In an alternative example embodiment, the game's initial web page (or some subsequent web page served up by the game) might have an Adobe Flash application (e.g., a Small Web Format or SWF file) embedded in it. In this alternative example embodiment, the user of browser 901 might thereafter interact with the Adobe Flash application (e.g., its GUI), causing it to interact with the server software 902 (e.g., Facebook) and the server software 903 (e.g., Zynga).

Figure 9B:
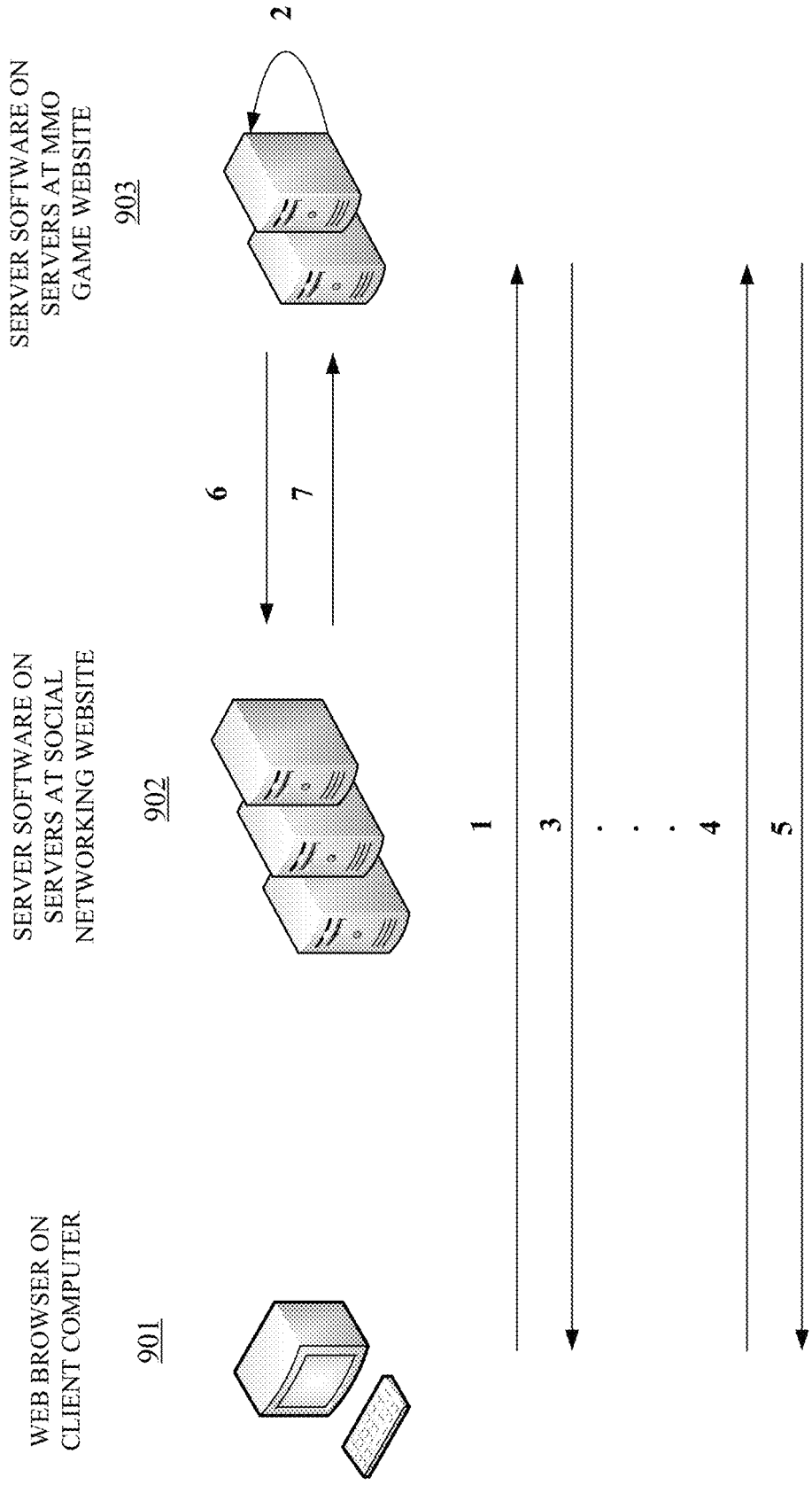
FIG. 9B is a simplified diagram that illustrates a sequence of transmissions associated with a social game task in an MMO game accessed from an MMO game website, in accordance with an example embodiment.

FIG. 9B is a simplified diagram that illustrates a sequence of transmissions associated with a social game task in a social MMO game accessed from a MMO website, in accordance with an example embodiment. In operation 1, the player clicks on a graphic for a social MMO game, causing browser 901 to transmit an HTTP request to server software 903 (e.g., Zynga) for the game's initial web page. The game's initial web page might be an application server page (e.g., PHP 5) or an HTML5 page. In operation 2, the application server page executes on server software 903 (e.g., Zynga), resulting in requests to databases and other servers as needed to complete generation of the web page, including possibly an HTTP request (not shown) transmitted to an API exposed by server software 902 (e.g., Facebook). In operation 3, the server software 903 (e.g. Zynga) returns the game's initial web page (e.g., HTML5 and JS) for the browser to display.

At some point thereafter, in operation 4, the player clicks on a graphic (e.g., representing a GUI widget) on a game web page (e.g., HTML5 and JS), causing browser 901 to transmit an HTTP request to server software 903 (e.g., Zynga), requesting assistance with a social game task (e.g., requesting a kitchen utensil from the player's friends on a social network, possibly including friends who are not presently players of the MMO game). In operation 5, the server software 903 (e.g. Zynga) returns a web page (e.g., HTML5 and JS) to the browser indicating that the request was received. In operation 6, the server software 903 (e.g., Zynga) transmits an HTTP request to an API exposed by server software 902 (e.g., Facebook), posting the request for assistance with a social game task to the profiles (e.g., through a Facebook notification) and/or streams of the requesting player's friends on the social network managed by server software 902 (e.g., Facebook). Here again, it will be appreciated that in order to access the friends' profiles and/or streams (e.g., using an access token), the server software 903 (e.g., Zynga) might have earlier obtained permission from the friends, e.g., when they joined the game. Then in operation 7, server software 902 (e.g., Facebook) sends a response, e.g., in JSON, to server software 903 (e.g., Zynga) describing the success or failure of the posting to each profile and/or stream.

Here again, in an alternative example embodiment, the game's initial web page (or some subsequent web page served by the game) might have an Adobe Flash application (e.g., a Small Web Format or SWF file) embedded in it. In this alternative example embodiment, the user of browser 901 might thereafter interact with the Adobe Flash application (e.g., its GUI), which, in turn, might interact with the server software 902 (e.g., Facebook) and the server software 903 (e.g., Zynga).

Though the disclosure above has focused on MMO games which might be social, some or all of the operations described above might be used in a gamification application rather than in an MMO game. It will be appreciated that gamification involves the use of game design techniques, game thinking, and game mechanics to enhance tasks performed in non-game contexts. So for example, some or all of the operations described above might be used in an employee training program, e.g., where the game tasks involve learning information relevant to the employee's duties, e.g., by analogy to computerized adaptive testing (CAT).

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. The operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed:

1. A method, comprising the operations of:
   assigning to a player of a massively multiplayer online (MMO) game a first game task in a conditional series of game tasks, wherein the assignment is based at least in part on a measure of difficulty associated with the first game task, wherein the measure of difficulty depends on a profile associated with the player that includes an Active Social Network (ASN) metric as determined by data that has been read from an in-memory database and that has been retrieved from a social networking website through an application programming interface (API) exposed by the social networking website, wherein the ASN metric is a count of friends of the player on the social networking website with whom the player has had a reciprocal interaction loop within a duration window that is within a recency period; and
   providing a reward to the player upon termination of the conditional series of game tasks, wherein the reward depends at least in part on the game tasks in the conditional series of game tasks that were completed by the player and wherein each operation of the method is executed by one or more processors.

2. A method as in claim 1, wherein the first game task includes a specified duration.

3. A method as in claim 2, further comprising the operation of:
   determining whether the player completed the first game task within the specified duration.

4. A method as in claim 3, further comprising the operation of:
   assigning the player a second game task in the conditional series of game tasks that is less difficult to complete than the first game task, if the player did not complete the first game task within the specified duration.

5. A method as in claim 3, further comprising the operation of:
   assigning the player a third game task in the conditional series of game tasks that is more difficult to complete than the first game task, if the player completed the first game task within the specified duration.

6. The method of claim 1, wherein friends are persons associated with the player by an access control list maintained by the social networking website.

7. The method of claim 1, wherein the reciprocal interaction loop occurs through an initial message and a response message.

8. The method of claim 1, wherein the reciprocal interaction loop occurs through an initial message and an action in response to the message.

9. One or more computer-readable storage media that are non-transitory and that store a program, wherein the program, when executed, instructs one or more processors to perform the following operations:
   assign to a player of a massively multiplayer online (MMO) game a first game task in a conditional series of game tasks, wherein the assignment is based at least in part on a measure of difficulty associated with the first game task, wherein the measure of difficulty depends on a profile associated with the player that includes an Active Social Network (ASN) metric as determined by data that has been read from an in-memory database and that has been retrieved from a social networking website through an application programming interface (API) exposed by the social networking website, wherein the ASN metric is a count of friends of the player on the social networking website with whom the player has had a reciprocal interaction loop within a duration window that is within a recency period; and
   provide a reward to the player upon termination of the conditional series of game tasks, wherein the reward depends at least in part on the game tasks in the conditional series of game tasks that were completed by the player.

10. Computer-readable storage media as in claim 9, wherein the first game task includes a specified duration.

11. Computer-readable storage media as in claim 10, further comprising the operation of:
    determine whether the player completed the first game task within the specified duration.

12. Computer-readable storage media as in claim 11, further comprising the operation of:
    assign the player a second game task in the conditional series of game tasks that is less difficult to complete than the first game task, if the player did not complete the first game task within the specified duration.

13. Computer-readable storage media as in claim 9, further comprising the operation of:
    assign the player a third game task in the conditional series of game tasks that is more difficult to complete than the first game task, if the player completed the first game task within the specified duration.

14. Computer-readable storage media as in claim 9, wherein friends are persons associated with the player by an access control list maintained by the social networking website.

15. Computer-readable storage media as in claim 9, wherein the reciprocal interaction loop occurs through an initial message and a response message.

16. Computer-readable storage media as in claim 9, wherein the reciprocal interaction loop occurs through an initial message and an action in response to the message.

17. A method, comprising the operations of:
    assigning to a player of a massively multiplayer online (MMO) game a first game task in a conditional series of game tasks, wherein the assignment is based at least in part on a measure of difficulty associated with the first game task, wherein the measure of difficulty depends on a profile associated with the player that includes an Active Social Network (ASN) metric as determined by data that has been read from an in-memory database and that has been retrieved from a social networking website through an application programming interface (API) exposed by the social networking website, wherein the ASN metric is a count of friends of the player on the social networking website with whom the player has had a reciprocal interaction loop within a duration window that is within a recency period, and wherein friends are persons associated with the player by an access control list maintained by the social networking website; and providing a reward to the player upon termination of the conditional series of game tasks, wherein the reward depends at least in part on the game tasks in the conditional series of game tasks that were completed by the player and wherein each operation of the method is executed by one or more processors.

18. A method as in claim 17, wherein the reciprocal interaction loop occurs through an initial message and a response message.

19. The method of claim 17, wherein friends are persons associated with the player by an access control list maintained by the social networking website.

20. The method of claim 17, wherein the reciprocal interaction loop occurs through an initial message and an action in response to the message.

* * * * *